United States Patent Office 3,301,902
Patented Jan. 31, 1967

3,301,902
PRODUCTION OF QUATERNARY HALO-
ALKYLAMMONIUM SALTS
Karl-Heinz Koenig, Joachim Datow, and Ernst-Heinrich
Pommer, Ludwigshafen (Rhine), Johann Jung, Limburgerhof, Pfalz, and Heinrich Scholz, Ludwigshafen
(Rhine), Germany, assignors to Badische Anilin- &
Soda-Fabrik Aktiengesellschaft, Ludwigshafen (Rhine),
Germany
No Drawing. Filed Feb. 24, 1964, Ser. No. 347,064
Claims priority, application Germany, Mar. 13, 1963,
B 71,102
4 Claims. (Cl. 260—567.6)

This invention relates to a process for the production of quaternary haloalkylammonium salts, especially the production of chlorocholine chloride.

The fact that alcohols can be converted relatively simply into alkyl chlorides by means of hydrogen chloride is already known. The possibility of replacing the hydroxyl group by a chlorine atom depends very much on the bond characteristics of the hydroxyl group or on its position relative to other activating or inactivating groups in the same molecule. The reaction involved, which probably proceeds via an oxonium chloride as an intermediate stage, is an equilibrium reaction, like similar esterification reactions. The exchange of a hydroxyl group for a chlorine atom by means of hydrogen chloride is known to be considerably more difficult or even impossible when passing in a series of alcohols from an aliphatic alcohol via an aliphatic amino alcohol to a hydroxyaliphatic quaternary ammonium salt. Thus for example ethanol can be reacted in very good yields to ethyl chloride by means of concentrated hydrochloric acid at about 90° to 110° C., possibly with an addition of some active carbon. It has further been found that ethanol-(2)-amine-(1) will react only to a very small extent to form 2-chloroethylamine hydrochloride with concentrated hydrochloric acid at atmospheric pressure and at the boiling temperature (about 150° to 160° C.) and that ethanol-(2)-trimethylammonium chloride will not react at all with concentrated hydrochloric acid at atmospheric pressure and boiling temperature (about 140° to 155° C.).

It is known that aliphatic hydroxyl groups in quaternary ammonium salts may be partly reacted in an inert organic solvent, for example toluene, xylene or gasoline, with organic acid halides, for example phosphorus halides, thionyl chloride or phosgene. These reactions are however unsatisfactory both in yield and purity of the end products. The reason for this lies in the physico-chemical behavior, i.e., in the solubilities of the quaternary ammonium salts. Quaternary ammonium salts are known to dissolve only in strongly polar media. These are unsuitable as solvents however because they themselves enter into reaction with the acid halides. Since the reactions can thus only be carried out in inert media in which the quarternary ammonium salts are insoluble, such heterogeneous reactions proceed only slowly and with moderate yields and lead to mixtures which still contain initial product.

U.S. patent specification No. 2,817,664 discloses the production of quaternary haloalkylammonium salts from tertiary amines and ω,ω'-dihaloalkanes under pressure and in the absence of water. This process is simple only at first glance. Since both halogen atoms in the ω,ω'-dihaloalkanes are capable of reacting with the tertiary amine (particularly when the ω,ω'-dihaloalkanes are short chained), the end product is not uniform but is a mixture of the symmetrical bis-quarternary ammonium salt and the corresponding monohaloalkyl compound. The end product must therefore be subjected to a further purification, for example recrystallization, and the by-products decrease the yield of the haloalkyl compound considerably.

We have now found that quaternary 2-chloroalkylammonium salts having the formula

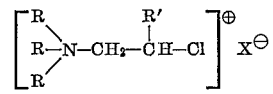

in which R denotes a lower alkyl radical having one to three carbon atoms, R' denotes a hydrogen atom or a lower alkyl radical having one to three carbon atoms and X denotes an anion obtained by reacting a corresponding quarternary hydroxyalkylammonium salt with hydrogen chloride. The choice of the anion is not critical and has no influence on the operation of the process. By the term "anion" as used in this specification we understand acid radicals, especially of inorganic mineral acids such as hydrochloric acid, sulfuric acid, phosphoric acid or nitric acid, or of strong organic acids such as formic acid, acetic acid or p-toluenesulfonic acid, or of phenoxyacetic acids or phenoxypropionic acids. It is advantageous to heat to elevated temperature a solution of a quaternary hydroxyalkyl ammonium salt which has been saturated with hydrogen chloride at low temperature, or preferably hydrogen chloride is forced under pressure and at elevated temperature onto a solution of a quaternary hydroxyalkyl ammonium salt until the pressure remains constant. The reaction proceeds according to the following equation in which R, R' and X have the meanings given above.

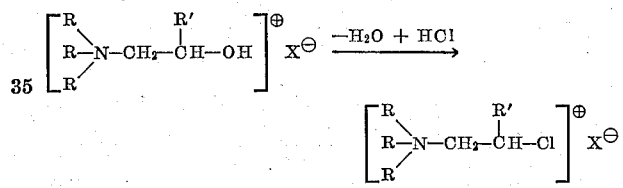

The reaction may be carried out continuously or batchwise. The quaternary 2-chloroalkylammonium salts are obtained in good yields and high purity. The process according to this invention has great advantages. It is extremely simple. Only very inexpensive initial materials are required and it is not necessary to use an organic solvent.

Such a reaction is unexpected because aliphatic chloroalkylamines having a halogen atom in β-position to the nitrogen atom are known to undergo rearrangement readily when heated in an acid medium (compare for example the rearrangement of 1-chloropropyl-2-dimethylammonium chloride into 2-chloropropyl-1-dimethylammonium chloride, J. Amer. Chem. Soc., 70, 48 (1948) and J., 1951, 1802).

The reaction is advantageously carried out at a temperature of more than 100° C. and at superatmospheric pressure, advantageously of more than 3 atmospheres gage. Temperatures of 130° to 180° C. and hydrogen chloride pressures of 10 to 40 atmospheres gage are particularly advantageous. Under these conditions, the absorption of hydrogen chloride occurs almost instantaneously.

The reaction is carried out with an aqueous or water-containing solution of the quaternary hydroxyalkylammonium salt. Dehydrating substances, for example sulfuric acid or zinc chloride, may be added in small amounts, for example 0.1 to 10% by weight, to the reaction mixture. It is advantageous to use the hydrogen chloride in excess for the reaction.

The aqueous solutions of the end products formed by the reaction may be worked up in conventional ways, for example by evaporation if the end product is to be isolated in solid form. The white to light grey crystalline products obtainable in this way are in general capable of being used for the purposes specified below without any additional treatment. It is also possible however to use the aqueous solutions after neutralisation or separation of the free acid, direct for the said purposes. If for a certain purpose it is necessary, the solutions may be lightened in color or clarified with active carbons, bentonites or bleaching earths. The yields obtained are 80 to 94% of the theory with reference to crystalline crude end product capable of immediate use.

Quaternary chloroalkylammonium salts are known to be plant growth regulators. Thus for example N,N,N-trimethyl-(2-chloroethyl)-ammonium chloride may be used with excellent results for controlling growth of cereals, particularly wheats.

The invention is further illustrated by the following examples. The parts specified in the examples are parts by weight.

EXAMPLE 1

*The production of trimethyl-(2-chloroethyl)-ammonium chloride*

300 parts of a 70% aqueous choline solution is heated to 150° C. in an autoclave and hydrogen chloride is forced in from a gas cylinder until a constant pressure of 16 atmospheres gage has been set up. A very rapid absorption of hydrogen chloride takes place initially. When the rate of absorption has become slow, hydrogen chloride is forced in again every ten minutes and, later, every twenty minutes, the pressure finally being kept constant at 16 atmospheres gage for another three to four hours until there is no further absorption of hydrogen chloride. The contents of the autoclave is filtered with a little active carbon and concentrated in vacuo until crystallization occurs. The crystalline crude product is suction filtered, washed with a little acetone and dried. The yield of crude product is 203 parts (chlorine: found 42.9%; theoretical 44.9%).

After recrystallization from a mixture of acetone and alcohol, the melting point is 241° to 242° C. (chlorine: found 44.5%; theoretical 44.9%).

The product may be stored in the air and is not hygroscopic.

EXAMPLE 2

40 liters per hour of a mixture of 32 parts of choline chloride, 35 parts of hydrogen chloride, 32 parts of water and 1 part of sulfuric acid is forced into an autoclave having a capacity of 200 liters which is acid-proof and capable of being heated. The temperature is adjusted to 160° C. The pressure is 30 atmospheres gage. An aqueous solution of chlorocholine chloride is withdrawn continuously from the autoclave and released from pressure. The yield of chlorochline chloride is 91% of the theory.

EXAMPLE 3

A mixture of 48 parts of choline chloride, 22 parts of water and 30 parts of hydrogen chloride is heated for eight hours at 170° C. in a pressure-resistant, acid-proof reactor fitted with a stirrer. A pressure of about 14 atmospheres gage is thus set up. After cooling the reactor and releasing the pressure, an acid solution is obtained which contains 58.6 parts of chlorocholine chloride. Conversion in this case is 85% of the theory. The solution is neutralized with 26.3 parts of a 50% caustic soda solution in an enamelled vessel. After an insignificant amount of impurity has been filtered off, a clear yellowish solution is obtained which may be used direct as a growth controller for cereals after it has been appropriately diluted with water.

We claim:

1. A process for the production of quaternary 2-chloroalkylammonium salts having the general formula:

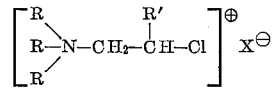

in which R denotes a lower alkyl radical having one to three carbon atoms, R' denotes a member selected from the group consisting of a hydrogen atom and a lower alkyl group having one to three carbon atoms and X denotes an anion, which comprises reacting a compound of the formula

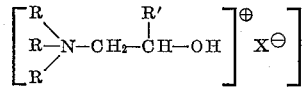

in which R, R' and X have the same meanings set forth, at a temperature of 100° C. to 180° C. and in an aqueous reaction medium with hydrogen chloride.

2. A process as claimed in claim 1 carried out at a temperature between 130° and 180° C.

3. A process as claimed in claim 1 carried out at a pressure of more than 3 atmospheres gage.

4. A process as claimed in claim 1 carried out at a pressure of from 10 to 40 atmospheres gage.

No references cited.

CHARLES B. PARKER, *Primary Examiner.*

UNITED STATES PATENT OFFICE
CERTIFICATE OF CORRECTION

Patent No. 3,301,902　　　　　　　　　　　　　　　January 31, 1967

Karl-Heinz Koenig et al.

It is hereby certified that error appears in the above numbered patent requiring correction and that the said Letters Patent should read as corrected below.

Column 1, lines 57, 62 and 69, for "quarternary", each occurrence, read -- quaternary --; column 2, line 13, after "anion" insert -- are --; lines 14 and 63, for "quarternary", each occurrence, read -- quaternary --; column 3, line 22, for "choline solution" read -- choline chloride solution --; column 4, line 3, for "chlorochline" read -- chlorocholine --; line 38, after "forth" insert -- above --.

Signed and sealed this 17th day of October 1967.

(SEAL)
Attest:

Edward M. Fletcher, Jr.
Attesting Officer

EDWARD J. BRENNER
Commissioner of Patents